Figure 1:
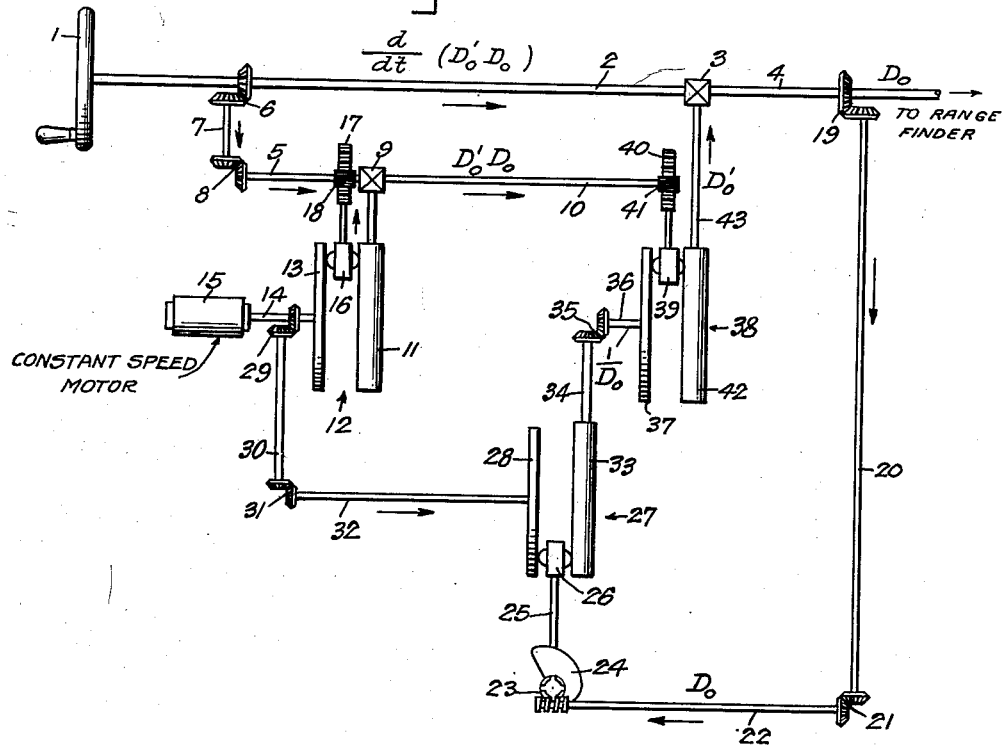

April 11, 1950     H. K. WEISS     2,503,310

REGENERATIVE RANGE TRACKING APPARATUS

Original Filed June 18, 1942

Inventor
HERBERT K. WEISS

By J. H. Church, W. E. Thibodeau + A. W. Dew
Attorneys

Patented Apr. 11, 1950

2,503,310

UNITED STATES PATENT OFFICE 2,503,310

REGENERATIVE RANGE TRACKING APPARATUS

Herbert K. Weiss, Joppa, Md.

Original application June 18, 1942, Serial No. 447,556, now Patent No. 2,433,006, dated December 23, 1947. Divided and this application September 4, 1947, Serial No. 772,039

5 Claims. (Cl. 235—61.5)

(Granted under the act of March 3, 1883, as amended April 30, 1928; 370 O. G. 757)

The invention described herein may be manufactured and used by or for the Government for governmental purposes, without the payment to me of any royalty thereon.

This application is a division of my copending application, Serial Number 447,556, filed June 18, 1942 now Patent 2,433,006, granted Dec. 23, 1947. In the earlier and parent case I have disclosed several species of a regenerative tracking mechanism incorporating means for generating rates, proportional to $S_g R_m/R_o^2$, where $S_g$ is the linear speed of a target being tracked and assumed to be constant, $R_m$ is the minimum range from the tracking point, of the target path, and $R_o$ is the instantaneous or present range of the target. Since the speed and course of the target are assumed to remain constant, the only variable in the term is $R_o$. This variable in the species shown, is introduced from a range finder of conventional type and a rate proportional to the reciprocal of the instantaneous range is obtained by varying the output speed of a variable speed device by means of a cam having a lift proportional to the range when rotated from said range finder by an amount proportional to range.

It is physically impossible to manually track a moving target in a precise and smooth manner. It is equally impossible to effect a precise and smooth adjustment of a range finder to the instantaneous range of such a target. For these reasons, it is highly desirable that the range input to the mechanism covered by my prior copending application be smoothed prior to introduction into such mechanism.

Accordingly, it is a purpose of the present invention to provide a manually controlled, variable speed device for driving the range adjustment of a range finder.

A second purpose is to provide a regenerative drive for the range input of a range finder which varies the rate of such input in a mathematically correct manner.

A third purpose is to provide a regenerative drive for a range finder wherein because of the feature mentioned in the preceding purpose, the range finder adjustment becomes automatic after a short period of tracking and remains so, as long as the target continues in straight line unaccelerated movement.

A fourth purpose is to provide a regenerative range tracking device wherein the adjustments of the range finder are fed back to produce a movement having a rate inversely proportional to generated range, which movement is varied in accordance with the product of range and range rate, to produce a resultant movement proportional to range rate.

Figure 2:
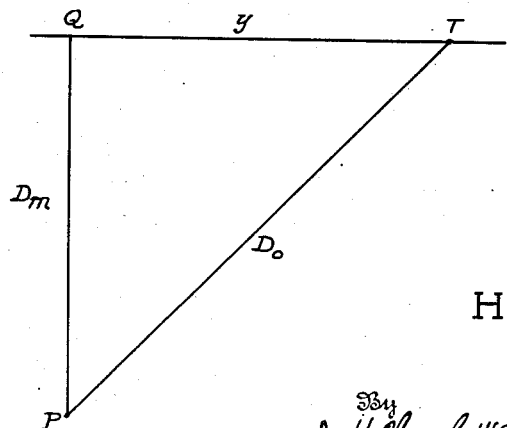

In the drawing, Fig. 1 is a schematic view showing the variable speed drives, the manual control, and their connection and interrelation and Fig. 2 is a diagram to explain the principle upon which the instrument operates.

In Fig. 2, let $D_0$ equal the present slant range of the target T, $D_m$ the least slant range of the target path, measured by dropping a perpendicular from the location P of the tracking instrument to said path, and $y$ the distance along the target path from the present target position to cross-over or the point Q of least slant range. Then $$D_0^2 = Y^2 + D_m^2 \qquad (1)$$

Differentiating (1) with respect to time and remembering that $D_m$ is a constant, $$D_0 \, D_0' = Y \, Y' \qquad (2)$$

Differentiating (2) with respect to time $$d/dt \, (D_0 \, D_0') = Y \, Y'' + (Y')^2 \qquad (3)$$

Since the target speed is assumed to be constant $Y'' = 0$ and (3) becomes $$d/dt \, (D_0 \, D_0') = (Y')^2 = S^2 \qquad (4)$$

$Y'$ is the speed of the target along path TQ and is assumed to be constant. It follows that, under the assumed conditions the product of slant range and slant range rate is constant and a motion proportional to such product may be utilized to modify a motion proportional to inverse range to provide a resultant motion proportional to range rate alone. This is the principle upon which my invention operates.

Referring in detail to the drawing, 1 identifies a handwheel mounted upon one end of a shaft 2. The other end of this shaft is connected to one side of a differential 3. A second side of differential 3 is connected with a shaft 4 having its other end connected to the range adjustment of a conventional range finder, not shown.

Shaft 2 is connected to drive a shaft 5 by means of bevel gears 6, shaft 7 and bevel gears 8. Shaft 5 is connected to drive one side of a differential 9 whose remaining two sides are connected respectively with a shaft 10 and the output element or roller 11 of a first variable speed device generally identified by the numeral 12.

The input element or disk 13 of variable speed device 12 is driven over shaft 14 by a constant speed motor 15. The roller 11 is driven at a speed proportional to the radial adjustment relatively to disk 13, of speed varying element or ball cage 16. Adjustment of cage 16 is effected by a rack 17 and pinion 18 fixed to shaft 5.

The rotation of range input shaft 4 is fed back by means of gears 19, shaft 20, gears 21, shaft 22, and worm and gear 23, to effect proportional rotation of a cam 24 designed to give to rod 25, a lift proportional to its rotation.

Rod 25 is connected to move ball cage 26 of a variable speed device 27, radially inwardly of disk 28 which may be driven at constant speed from motor 15 by means of gears 29, shaft 30, gears 31, and shaft 32. The roller or output element 33 of variable speed device 27 is thus driven at a rate inversely proportional to the generated range and is connected by way of shaft 34, gears 35 and shaft 36, to drive disk 37 of a third variable speed device 38 whose ball cage or speed varying element 39 is adjusted by rack 40, in mesh with pinion 41, fixed to shaft 10. The roller or output element 42 of variable speed device 38, is connected by shaft 43 to drive a third side of differential 3.

In operation, the operator while looking into the eyepiece of the range finder, adjusts handwheel 1. Adjustment passes by shaft 2 through differential 3 to shaft 4 thereby controlling the range adjustment of the range finder in the manner necessary to focus the same upon the target. The adjustment of shaft 4 is fed back to cam 24 which displaces the ball cage 26 of variable speed device 27 inversely proportional to generated slant range. The rate of the output of variable speed device 27 is therefore inversely proportional to range. This output drives the disk 37 of variable speed device 38. The movement of handwheel 1 adjusts cage 16 of variable speed device 12, the movement also passing through differential 9 to adjust the ball cage 39 of variable speed device 38.

After a short interval of adjustment a steady state is reached in which shaft 10 turns at a constant rate. Variable speed device 12 settles to this correct rate, after which no further adjustments of handwheel 1 is required. If the circuit constants have been chosen correctly, the position of shaft 10 is the product of range and range rate; that is, $D_0'$, $D_0$, which, in accordance with the previously-developed equation, changes at a constant rate. Disk 37 is rotated at a rate corresponding to $1/D_0$, as previously explained. Hence output shaft 43 and shaft 4 after the device reaches a steady state, are driven at a rate proportional to $D_0' D_0 \times 1/D_0$ that is, in accordance with $D_0'$, the rate of change of range. It should be noted that, should variable speed device 12 be eliminated, the system is an aided tracking circuit with aiding ratio increasing with range. By making device 12 somewhat sluggish in response to turning of handwheel 1, the response characteristics of the circuit as revealed to the operator, will be similar to those of a good aided tracking circuit.

Thus, I have provided a range regenerating circuit which, after a relatively short period of adjustment, correctly regenerates range and which will thus act to maintain the range finder correctly focused upon the target so long as the latter maintains constant course and speed.

While I have shown a preferred form of range regenerating apparatus as now known to me, various substitutions of equivalents and rearrangements of parts, will readily occur to those skilled in the art after a study of the present disclosure. The disclosure should thus be taken in an illustrative rather than a limiting sense, and I desire to reserve all changes falling within the scope of the subjoined claims.

Having now fully disclosed the invention, what I claim is:

1. In a range regenerating apparatus for a range finder, a differential, a manually operable device and a range input element for direct mechanical connection with the range finder, said device and element being connected with two sides of said differential, respectively, a variable speed device having its output element connected to drive a third side of said differential, means operated by said element for driving said variable speed device at a rate proportional to inverse range, and means under control of said manually operable device for adjusting the speed varying element of said device in accordance with the product of range and range rate of a moving target tracked by said range finder.

2. In a range regenerating drive for a range finder having a range input element connected to directly operate the range adjustment of the finder, a differential, a handwheel, a first variable speed device having an output element, means drivingly connecting said handwheel and elements to the three sides, respectively, of said differential, second variable speed means controlled by said range input element to drive said first variable speed device at a rate proportional to inverse range, and third variable speed means controlled by said handwheel to adjust the speed-varying element of said first variable speed device in accordance with the product of range and range rate of a target being tracked by said range finder.

3. A range regenerating drive as claimed in claim 2, said last-named means including a second differential, having sides directly driven, respectively, by said third variable speed device and said handwheel, and a driving connection from the third side of said second differential to the speed-varying element of said first variable speed device.

4. In a regenerating drive for a range finder, an element adapted for direct mechanical driving connection with the range adjusting element of the finder, a first differential, a handwheel, a first variable speed device having an output element, direct mechanical connections from said handwheel and elements to the three sides, respectively, of said first differential, a second variable speed device having an output connected to drive said first variable speed device, cam means driven by said first-named element to adjust said second variable speed device in accordance with generated range, and means including a third variable speed device responsive to adjustment of said handwheel, for varying the speed of said first variable speed device in proportion to the product of instantaneous range and rate of change of range of a moving target tracked by the range finder.

5. In a range regenerative apparatus, a shaft adapted for connection to drive the range adjusting element of a range finder, a handwheel, a first variable speed device, a second variable speed device having its output connected to drive said first variable speed device, means driven by said shaft for regulating said second variable speed device so that its output speed varies inversely in proportion to generated range as represented by turning of said shaft, a third variable speed device, a driving connection between the speed-varying element of said third variable speed device and said handwheel, a first differential, means driving two sides of said first differential from said handwheel and the output of said first variable speed device, respectively, a driving connection from the third side of said differential to said shaft, a second differential, means driving two sides of said second differential from said handwheel and the output of said third variable speed device respectively, and a driving connection between the third side of said second differential and the speed-varying element of said first variable speed device.

HERBERT K. WEISS.

REFERENCES CITED

The following references are of record in the file of this patent:

UNITED STATES PATENTS

| Number | Name | Date |
|---|---|---|
| 2,071,424 | Papello | Feb. 23, 1937 |
| 2,105,985 | Papello | Jan. 18, 1938 |
| 2,206,875 | Chafee et al. | July 9, 1940 |
| 2,385,952 | Svoboda | Oct. 2, 1945 |